(12) United States Patent
Chiang

(10) Patent No.: US 7,533,867 B1
(45) Date of Patent: May 19, 2009

(54) ADJUSTABLE CABLE HANGER FOR A BICYCLE

(75) Inventor: Douglas Chiang, Taichung (TW)

(73) Assignee: Tien Hsin Industries Co., Ltd., Taichung Hsien (TW)

( * ) Notice: Subject to any disclaimer, the term of this patent is extended or adjusted under 35 U.S.C. 154(b) by 0 days.

(21) Appl. No.: 12/104,404

(22) Filed: Apr. 16, 2008

(51) Int. Cl.
*B66D 3/00* (2006.01)

(52) U.S. Cl. ............... 254/231; 403/408.1; 280/264; 188/24.21

(58) Field of Classification Search ............ 254/231; 403/396, 408.1, 384; 280/264; 188/24.19, 188/24.21, 24.22
See application file for complete search history.

(56) References Cited

U.S. PATENT DOCUMENTS 5,538,107 A * 7/1996 Lumpkin ............... 188/24.21
5,626,209 A * 5/1997 Viola ..................... 188/24.14
5,853,069 A * 12/1998 Lee et al. ............... 188/24.19
5,960,913 A * 10/1999 Kuo ....................... 188/24.19

* cited by examiner

*Primary Examiner*—Emmanuel M Marcelo

(57) ABSTRACT

A cable hanger includes a base having an opening defined to stably sleeve on a tube of a bicycle and an adjust unit connected to the base. The base has a tongue outwardly extending therefrom and a through hole defined in the tongue. The adjust unit comprising an adjust base and an adjuster is partially mounted in the through hole. The adjust base is mounted on the tongue and has a hole aligned with the through hole for receiving the adjuster. The adjuster has a through hole aligned with the through hole in the tongue for adapting a cable. The cable passes through the through holes in the adjuster and the tongue. A tension of the cable is adjusted by a movement of the adjuster relative to the tongue.

4 Claims, 4 Drawing Sheets

ADJUSTABLE CABLE HANGER FOR A BICYCLE

BACKGROUND OF THE INVENTION

1. Field of the Invention

The present invention relates to a cable hanger, and more particularly to an adjustable cable hanger for a bicycle.

2. Description of Related Art

A conventional cable hanger in accordance with the prior art comprises a plate having a hole defined therethrough and a bent side extending from a lower end of said plate. Three protrusions split from said plate and define three apertures. A flange extends from a top end of said plate and two notches are defined in said flange. A positioning plate is engaged between said flange and said protrusions. A central hole is defined through said positioning plate. A bolt extends through said hole in said plate and said central hole in said positioning plate, and a nut is engaged with said bolt. Two brake cables extend through notches in the flange and are securely clamped between the positioning plate and the plate.

The conventional cable hanger has some defects. The conventional cable hanger only assembles with the cables so the cable hanger will move inadvertently or interfere with other parts by accident. The conventional cable hanger can't adjust the cable tension. The cable will loose after a long period of using. The only way for conventional cable hanger is to re-clamp the cable. It is inconvenient and inefficient for the user or the consumer.

The present invention has arisen to mitigate and/or obviate the disadvantages of the conventional cable hanger.

SUMMARY OF THE INVENTION

The main objective of the present invention is to provide an improved cable hanger for a bicycle, in that a tension of a cable can be adjusted by the cable hanger.

To achieve the objective, the cable hanger in accordance with the prevent invention comprises a base having an opening defined therein and adapted to be stably sleeved on a tube of a bicycle, and a tongue outwardly extending therefrom, a through hole defined in the tongue; and an adjust unit partially mounted in the through hole and connected to the tongue, the adjust unit comprising an adjust base and an adjuster, the adjust base mounted on the tongue and having a hole centrally defined to align with the through hole for receiving the adjuster, the adjuster having a through hole centrally defined to align with the through hole in the tongue for allowing a cable extending through the adjust unit, wherein the cable passes through the through holes in the adjuster and the tongue and a tension of the cable is adjusted by a movement of the adjuster relative to the tongue.

Further benefits and advantages of the present invention will become apparent after a careful reading of the detailed description with appropriate reference to the accompanying drawings.

DETAILED DESCRIPTION OF THE INVENTION

Figure 1:
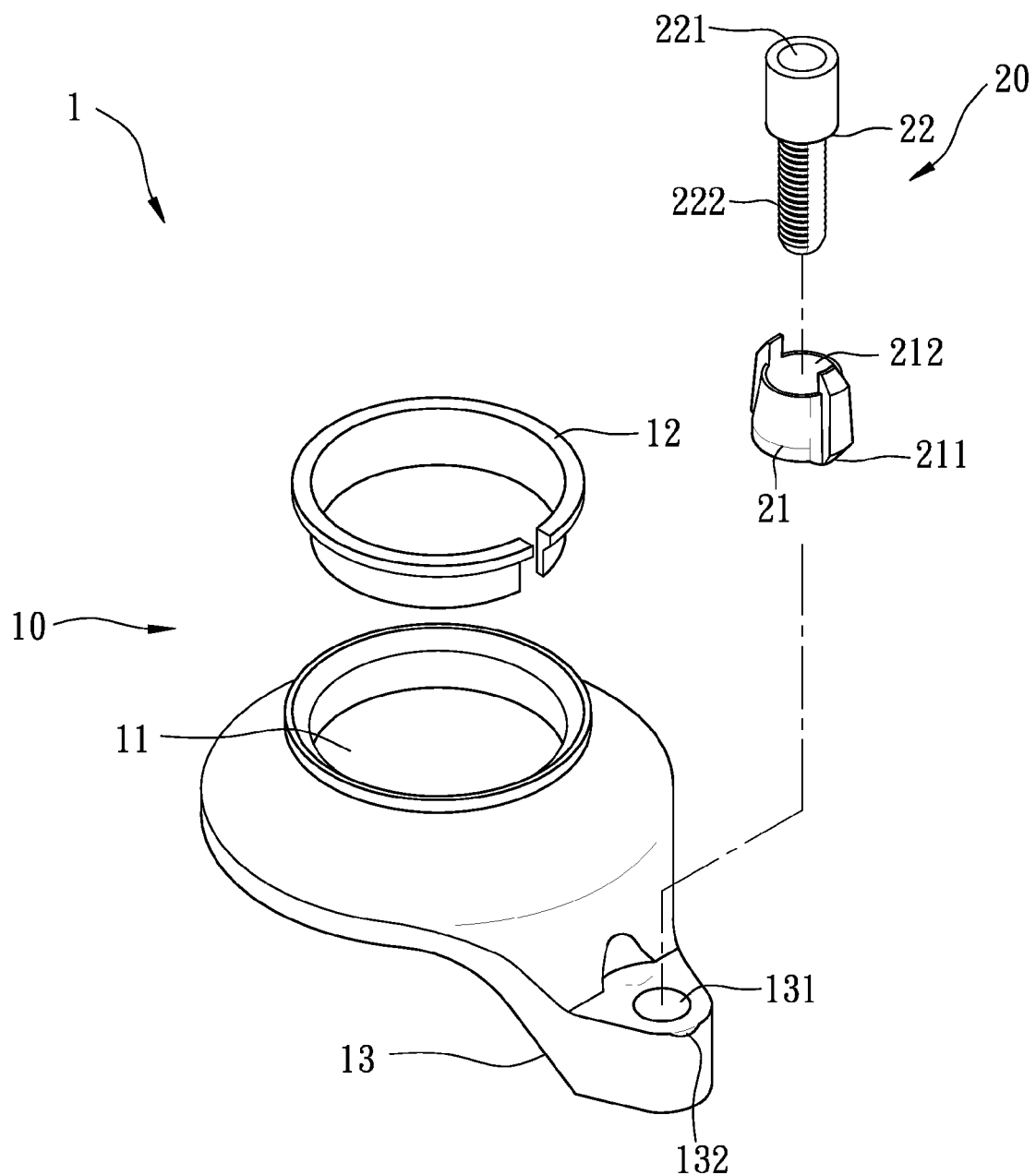
FIG. 1 is an exploded perspective view of a cable hanger in accordance with the present invention.
Figure 2:
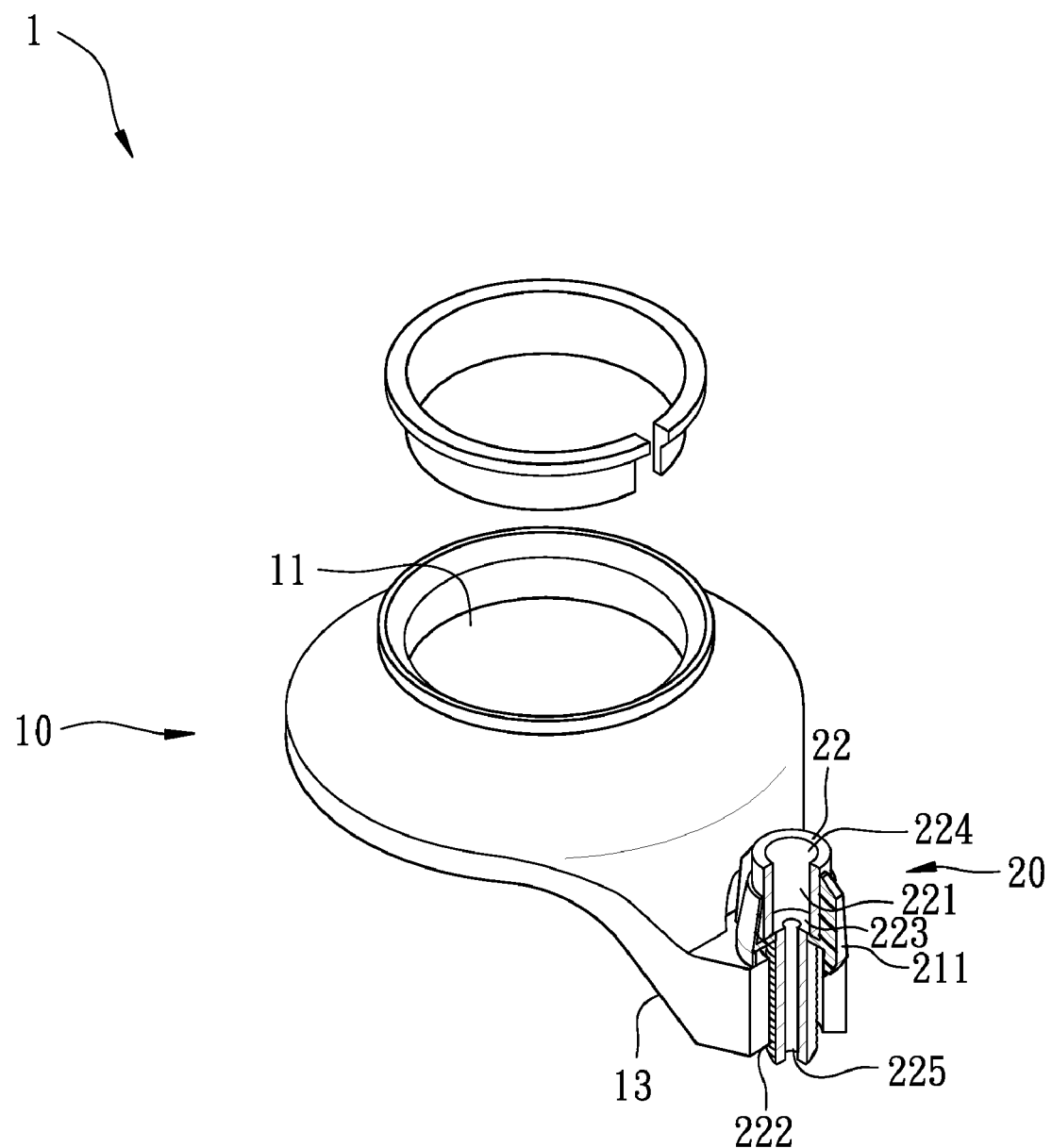
FIG. 2 is an exploding perspective view of the cable hanger in accordance with the present invention in partial cross-section.
Figure 3:
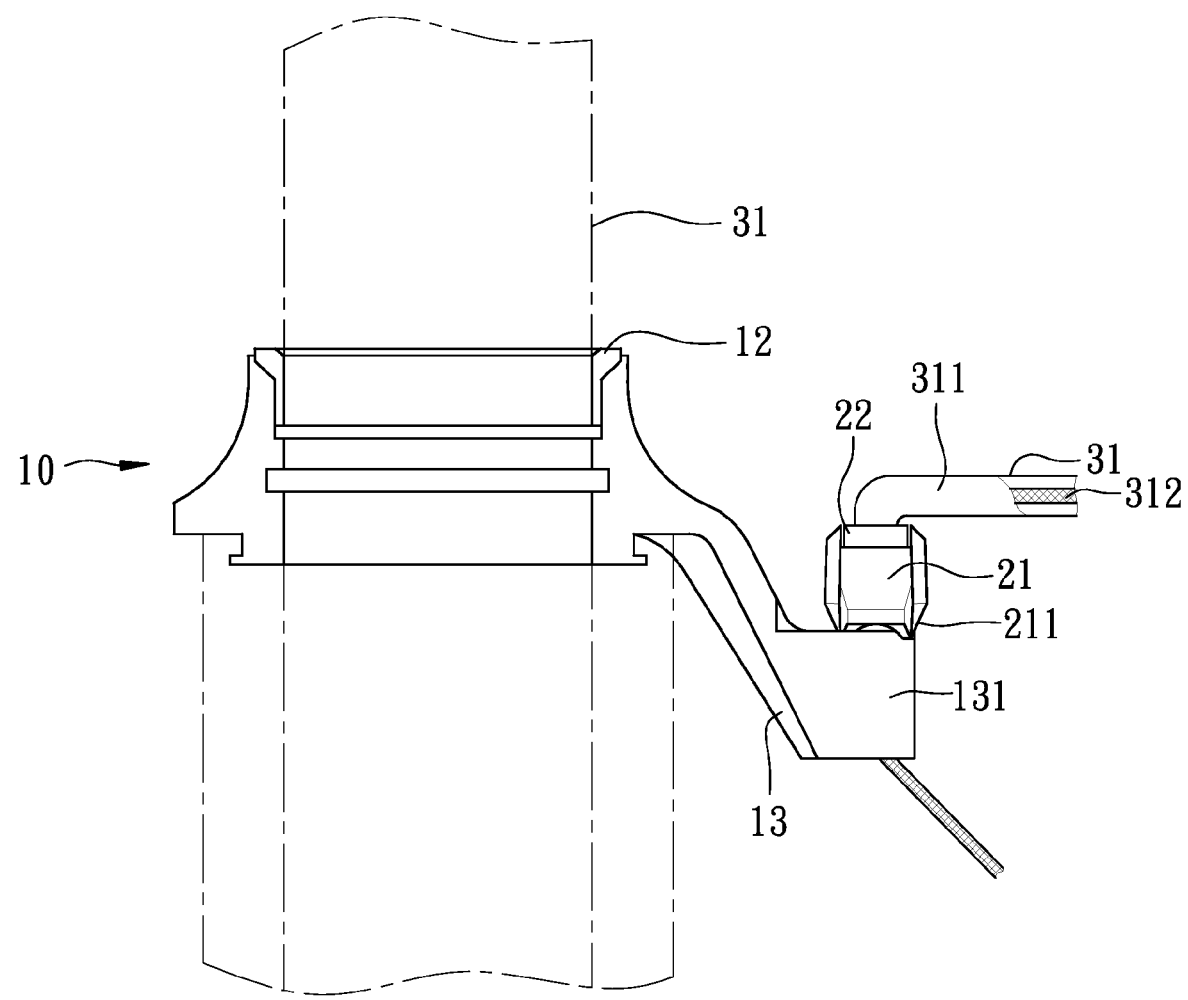
FIG. 3 is a side plan view of the cable hanger in accordance with the present invention in partial cross-section.
Figure 5:
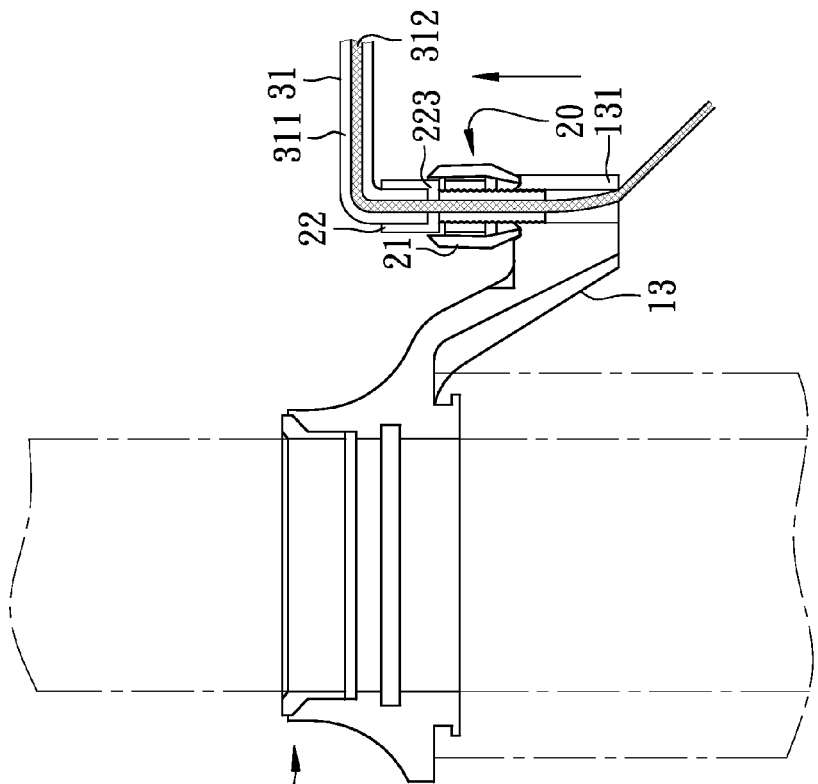
FIG. 5 is a side cross-sectional view showing the operation of the adjuster in accordance with the present invention.
Figure 4:
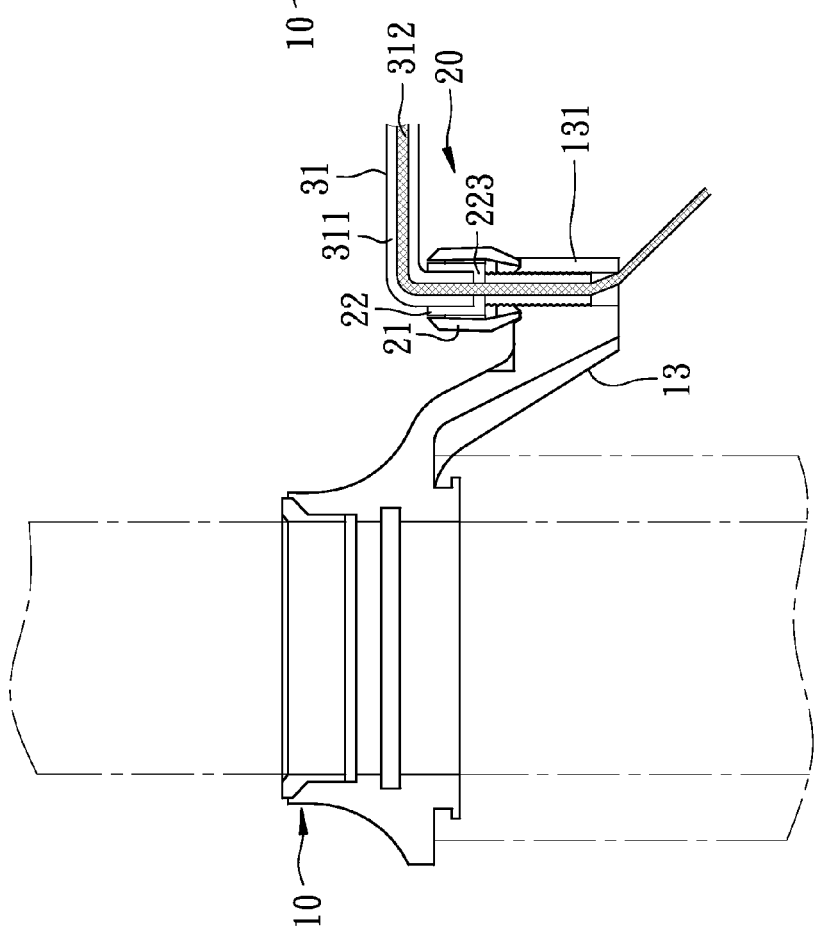
FIG. 4 is a side cross-sectional view showing the operation of the adjuster in accordance with the present invention.

Referring to the drawings and initially to FIGS. 1-3, a cable hanger in accordance with the present invention comprises a base 10 and a adjust unit 20 connected to the base 10, wherein the adjust unit 20 is positioned be a tension of a cable that extends through the adjust unit 20, as shown in FIGS. 4 and 5.

The base 10 has an opening 11 defined therein and adapted to stably sleeve on a steering tube 31 of a bicycle, and a tongue 13 outwardly extending therefrom. A locking ring 12 is mounted in the opening 11 between the base 10 and the steering tube 31 for holding the base 10 in place. In the preferred embodiment of the present invention, the base 10 is also provided as an upper cap of a headset. The tongue 13 has a round through hole 131 and at least two indentations 132 respectively defined therein, wherein the at least two indentation 132 diametrically surround the through hole 131 for selectively positioning the adjust unit 20.

The adjust unit 20 comprises an adjust base 21 mounted on the tongue 13 and an adjuster 22 partially mounted into the adjust base 21. The adjust base 21 has a hole 212 centrally defined therein and extending therethrough. The hole 212 is aligned with the through hole 131 for receiving the adjuster 22. The adjust base 21 includes at least two ribs 211 downward extending therefrom and simultaneously received in at least two indentations 132 for selectively holding the adjust base 21 in place. The adjust base 21 has a thread 213 on an inner periphery of the hole 212.

The adjuster 22 has a through hole 221 centrally defined therein and aligned with the through hole 131 in the tongue 13 for allowing a cable 31 extending through the adjust unit 20. The cable 31 is a braking cable or a shifting cable. The adjuster 22 has a shoulder 223 positioned on an inner periphery of the through hole 221 in the adjuster 22 and therefore the through hole 221 in the adjuster 22 is divided into an upper hole portion 224 and a lower hole portion 225, wherein the upper hole portion 224 has a diameter greater than that of the lower hole portion 225. The adjuster 22 has a thread 222 formed on an outer peripheral thereof. The thread 222 of the adjuster 22 corresponds to the thread 213 of the hole 212 of the adjuster base 21 such that the adjuster 22 is longitudinally moved relative to the adjust base 21 when the adjust base 21 is rotated.

Referring to FIGS. 4 and 5, the cable 31 comprises an inner cable wire 312 passing through the through holes 221, 131 respectively in the adjuster 222 and the tongue 13 and a cable housing 311 coating with an outer periphery of the inner cable wire 312. The cable housing 311 extends into the upper hole portion 224 and stops by the shoulder 223. The inner cable wire 312 continually passes through the lower hole portion 225 and the through hole 131 in the tongue 13. When the user wants to tighten or loosen the cable wire 312, he/she can rotate the adjust base 21 by hand. By rotating the adjuster base 21, the adjuster 22 will move along a direction of an axis of the hole 212. A tension of the cable wire 312 is adjusted by a movement of the adjuster 22 relative to the tongue 13. When the movement of the adjuster 22 is away from the tongue 13, the cable wire 312 is tightened. When the movement of the adjuster 22 is toward the tongue 13, the cable wire 312 is loosened. Furthermore, at least two ribs 211 simultaneously received in at least two indentations 132 will prevent the adjust base 21 from rotating by accident. The tension of the cable 31 will not change inadvertently.

Although the invention has been explained in relation to its preferred embodiment, it is to be understood that many other possible modifications and variations can be made without departing from the spirit and scope of the invention as hereinafter claimed.

What is claimed is:

1. A cable hanger comprising:
    a base having an opening defined therein and adapted to be stably sleeved on a tube of a bicycle, and a tongue outwardly extending therefrom, a through hole defined in the tongue; and
    an adjust unit partially mounted in the through hole and connected to the tongue, the adjust unit comprising an adjust base and an adjuster, the adjust base mounted on the tongue and having a hole centrally defined to align with the through hole for receiving the adjuster, the adjuster having a through hole centrally defined to align with the through hole in the tongue for allowing a cable extending through the adjust unit,
    wherein the cable passes through the through holes in the adjuster and the tongue and a tension of the cable is adjusted by a movement of the adjuster relative to the tongue.

2. The cable hanger as claimed in claim 1, wherein the adjust base has at least two ribs downward extending therefrom and the tongue has at least two indentations defined to simultaneously receive the at least two ribs for selectively holding the adjust base in place.

3. The cable hanger as claimed in claim 1, wherein the adjuster has a shoulder positioned in the through hole in the adjuster.

4. The cable hanger as claimed in claim 1 further comprising a locking ring mounted in the opening and adapted to be sleeved on a tube of a bicycle for positioning the cable hanger on the bicycle.

* * * * *